Feb. 22, 1949.  J. B. DRYDEN  2,462,076
TANK FILLING CONTROL
Filed Jan. 27, 1945
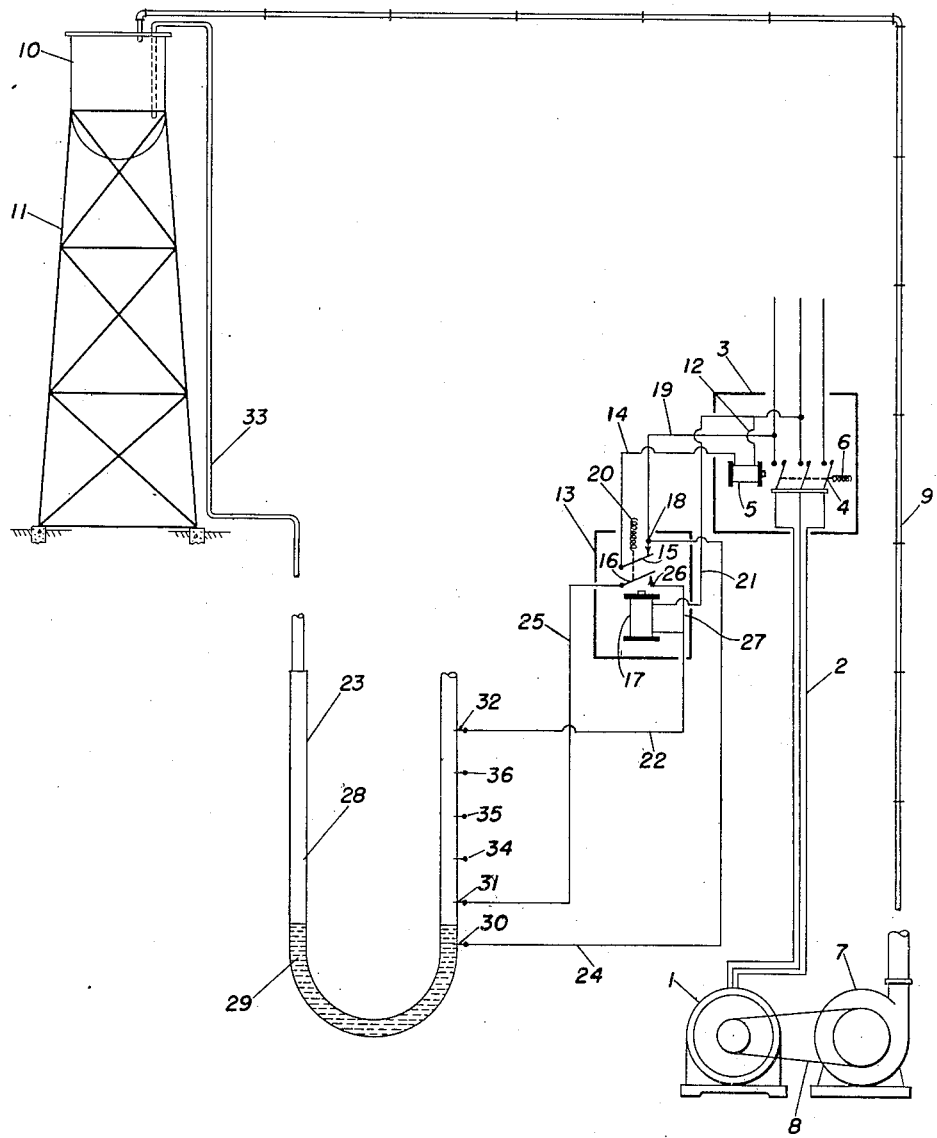
JAMES BURTON DRYDEN
INVENTOR.
BY
*W. A. McGrew*
ATTORNEY Patented Feb. 22, 1949

2,462,076

UNITED STATES PATENT OFFICE 2,462,076

TANK FILLING CONTROL

James Burton Dryden, Carlsbad, N. Mex.

Application January 27, 1945, Serial No. 574,955

9 Claims. (Cl. 103—25)

This invention relates to liquid containers and more particularly to a system for maintaining liquid in a container from which liquid is withdrawn either continuously or periodically.

One of the objects of the invention is to provide an improved system for transferring a liquid to a container which will be automatically controlled by the level of the liquid in the container.

Another object is to provide improved control means for a pump employed in filling a container which will so automatically control the pump that liquid will be continuously supplied to the container when liquid in said container falls below a predetermined level and until the liquid reaches a predetermined higher level.

A further object is to provide in a liquid level control system for a container an improved electrical circuit and control means for an electric motor driven supply pump.

A still further object is to provide in a control system an improved fluid pressure operated U-tube electrical circuit controlling switch.

Other objects of the invention will become apparent from the following description taken in connection with the accompanying drawing showing, by way of example, a liquid control system embodying the invention.

In the drawing the single figure is a schematic view of a liquid container provided with an electric motor operated pump with which is associated a control system responsive to levels of the liquid in the container, said control system being shown in a condition where the pump is being caused to operate.

Referring to the schematic view in detail, the numeral 1 indicates an electric motor which is supplied by current through a three-wire line system 2, having associated therewith a starter switch generally indicated by the numeral 3 and comprising three switch arms 4. These switch arms are to be controlled by a solenoid 5 and a spring 6 which normally holds the switch arms in open position when the solenoid is not energized.

The electric motor 1 is preferably a constant speed motor and, as shown by way of example, is arranged to drive a pump 7 by means of a belt 8. This pump transfers liquid from any source (not shown) through a pipe or other conduit 9 to a container or tank 10 which is shown as being supported on the top of tower 11 for gravity feed purposes. The tank is provided with an outlet (not shown) for withdrawing liquid to any place where it is desired. The liquid to be withdrawn may vary in amount and if it should not be withdrawn as rapidly as it is received from the pump, the tank would ultimately overflow, providing the motor and pump were not shut off. If the motor were shut off by some manual control, it would be necessary to give attention to starting the motor when there was need for again supplying liquid to the tank. Where liquid is withdrawn in varying volumes and periodically from the tank, it is readily seen that it is highly desirable to provide some automatic means for controlling the starting and stopping of the motor which drives the pump. With such an automatic arrangement it will not be necessary for anyone to constantly watch the level in the tank so as to be certain that all liquid will not be drawn out of the tank and thereby seriously affect some subsequent operation involving the liquid.

In accordance with my invention I have associated with the liquid containing tank and the motor control switch an improved control means whereby liquid will always be maintained in the tank by proper pump operation and the pump will not operate, after it has filled the tank to a maximum level, until the tank level falls below a predetermined level which may be close to the bottom of the tank.

The solenoid 5, already mentioned as being arranged to control the motor starter switch, has one end of its coil connected by a conductor 12 to the central conductor of the three-wire line system ahead of the switch. The other end of the coil of the solenoid is connected to a relay switch 13 by means of a conductor 14. This relay switch is provided with two switch elements 15 and 16 for controlling two circuits. The elements are shown as switch arms and are controlled by a single solenoid 17. The pivoted end of the switch arm 15 has connected thereto the previously mentioned conductor 14 coming from the starter switch solenoid 5 and the free end of this switch arm is arranged to engage a fixed contact 18 which is connected by a conductor 19 to one of the outside conductors of the three-wire line system. It is thus seen with this arrangement there may be established a circuit by which the solenoid 5 of the starter switch can be energized, this circuit being closed whenever the arm 15 is engaged with the contact 18. This condition is caused to prevail whenever the solenoid 17 is not energized and is brought about by the usual spring 20 which acts upon both mechanically connected switch arms 15 and 16.

In order that the solenoid 17 of the relay switch 13 may be energized to bring about a breaking of the circuit for the starter switch solenoid 5, one end of the coil of the solenoid 17 is connected to the central wire of the three-wire line system by means of a conductor 21. The other end of the coil of this solenoid is connected by a conductor 22 to a special U-tube switch generally indicated by the numeral 23. Another conductor 24 leads from this U-tube switch to the previously referred to contact 18 which, as already mentioned, is connected to the line by the conductor 19. It is thus seen by this arrangement that if the conductors 22 and 24 are connected by the U-tube switch, there will be a circuit established including the solenoid 17, thus energizing this solenoid and causing the two switch arms 15 and 16 to be moved with the result that the switch arm 15 will be disengaged from the contact terminal 18. This breaks the circuit of the solenoid 5 and the starter switch will be opened, thus stopping the electric motor and pump.

If the circuit including the conductors 22 and 24 and the solenoid 17 only were provided, it is seen that as soon as this circuit was broken the motor would again be started due to the re-energization of the starter solenoid circuit. Provision is therefore made to provide a holding circuit for the relay switch 13 which will insure that the solenoid 17 will continue to be energized, notwithstanding that the circuit including the conductors 22 and 24 is broken. This holding circuit will continue to cause the solenoid to be energized until a predetermined condition arises which predetermined condition will be the minimum level which is desired for the liquid in the tank 10. This holding circuit includes the previously mentioned switch arm 16 which is interconnected with the switch arm 15. This switch arm is connected by a conductor 25 with the U-tube switch 23 in order to make a separate circuit with the previously mentioned conductor 24 which is also connected to the U-tube switch. The switch arm 16 has associated therewith a contact element 26 which is engaged by the switch arm whenever the solenoid 17 is energized and this contact element is connected by a conductor 27 with the same end of the solenoid coil as the previously mentioned conductor 22. Thus whenever the switch arm engages the contact 26 a circuit will be established including the solenoid 17, provided of course that the conductors 24 and 25 are connected by the U-tube switch. Thus whenever this circuit is established the solenoid will be held energized and the switch arm 15 maintained open to insure that the starter solenoid 5 will not be energized.

The U-tube switch 23 comprises a U-tube member 28 in which is positioned a body of conducting liquid 29, such as mercury. One leg of the U-tube is provided with three contact terminals 30, 31 and 32, spaced longitudinally in the wall and arranged to be contacted by the mercury 29 as it is moved up the leg of the tube. The lower terminal 30 is so positioned in the leg of the tube that it will always be engaged by the mercury when in its normal position in the tube and this terminal has connected thereto the previously referred to conductor 24. Spaced a short distance above the terminal 30 is the terminal 31 and to this terminal is connected the conductor 25 of the holding circuit. Above the terminal 27 is the terminal 32 and to this terminal is connected the conductor 22. Whenever the mercury in the U-tube is sufficiently pushed up the leg having the terminals, the conductors 22 and 24 will be connected and the circuit established for energizing the solenoid 17 which will result in the breaking of the circuit including the starter switch solenoid 5 and thereby open the motor line to stop the pump. Whenever the mercury engages terminal 31 the holding circuit will be conditioned to be closed by the closing of switch arm 16.

The other leg of the U-tube is connected to a pipe or conduit 33 which is arranged to extend down into the tank 10 from the top thereof and to a point adjacent the tank bottom. With this arrangement the liquid in the tank as it rises will also rise in the pipe 33 and displace air in the pipe which will result in the application of pressure to the column of mercury in the U-tube. This will move the column of mercury up into the leg containing the terminals. The arrangement is such that whenever the liquid in the tank reaches a level adjacent the top of the tank, the mercury will have been forced up to a point to contact the terminal 32, thus connecting the conductors 22 and 24 and energizing the solenoid 17. The result is that the motor starter switch will be opened, thus stopping pump operation. As liquid is withdrawn from the tank 10, the mercury will recede in the terminal leg of the U-tube and consequently the terminal 32 will no longer be engaged by the mercury. As a result the conductors 22 and 24 will be disconnected. However, this will not result in any de-energization of the solenoid 17 to change the open condition of the motor starter switch as the mercury will continue to be in engagement with the terminal 31. Since the switch arm 16 is already in closed position the holding circuit will be closed and the solenoid 17 will continue to be energized. This condition will prevail until the liquid in the tank has been withdrawn to a point where the mercury will be in such a position as to no longer engage the terminal 31. When this occrs the holding circuit will be opened and as a result the solenoid 17 will become de-energized. The spring 20 will then be effective to open the switch arm 16 and cause a closing of the switch arm 15, thereby closing the circuit for the starter switch solenoid 5 and energizing this solenoid. Consequently the starter switch arms will be automatically closed, again bringing about operation of the motor and pump. Liquid will then again be supplied to the tank until the level is reached where the mercury in the U-tube is forced up the terminal leg and engages the terminal 32. It will be noted that as the mercury moves up the leg of the U-tube to where it engages the terminal 32 it re-connects the conductors 24 and 25, but there will be no energization of the solenoid 17 due to the fact that the switch arm 16 is in open position.

From the foregoing description it is seen that there is provided an automatic control for the liquid supply system of a tank. The pump, once it begins operating, will supply liquid to the tank until a maximum level is reached, whereupon the pump will automatically be stopped and will remain stopped until the level of the liquid in the tank falls to a predetermined minimum. At this point the motor and pump will again be operated to bring the level of the liquid back up to the maximum. The control system for the operation of the motor and pump is very simple and embodies only a solenoid operated starter switch for the motor, a relay, a level controlled U-tube switch and suitable conductors for completing the circuits.

If desired, the U-tube may be provided with a series of terminals 34, 35 and 36 besides the terminals already mentioned.

With such additional terminals the U-tube switch can be employed with various size tanks and can be quickly adapted to maintain various maximum and minimum levels. For example, if the conductor 22 is connected to the terminal 36, then when the level of the liquid in the tank reaches such a height that the mercury will be caused to engage the terminal 36, the motor will be stopped and the pump will no longer furnish liquid to the tank to raise the level above the level where the terminal 36 was caused to be engaged by the mercury. Also if the minimum level of the tank is desired to be raised, the conductor 25 can be connected with terminal 34. When the mercury no longer engages this terminal the motor will be started to add liquid to the tank.

Being aware of the possibility of modifications in the particular structure shown and described without departing from the fundamental principles of the invention, it is not intended that the scope thereof be limited except in accordance with the appended claims.

What is claimed is:

1. In a control system for supplying liquid by a pump to a container, an electric motor for driving the pump, a line connection for the motor, a switch for the motor line, a solenoid for controlling the switch, a circuit for the solenoid, a spring biased switch in said circuit, and means controlled by the level of the liquid in the container for so controlling the solenoid circuit switch that said switch will be closed by the bias of its spring to energize the solenoid and cause operation of the motor when the liquid falls below a predetermined minimum level and will be opened against the bias of the spring to de-energize the solenoid and cause stopping of the motor when the pump raises the liquid to a predetermined higher level, said last named means embodying electrically controlled holding means for maintaining the switch open after it has been opened and until the liquid again falls to the first predetermined level.

2. In a control system for supplying liquid by a pump to a container, an electrical motor for driving the pump and having a line connection, a switch in the line, a solenoid for controlling the switch, a circuit for the solenoid including a second switch, a second solenoid for opening the second switch, a circuit for the second solenoid, means for closing the circuit for the second solenoid when the level of the liquid in the container reaches a predetermined height, a holding circuit including said second solenoid, and means for maintaining the holding circuit closed until the liquid in the container falls to a level below the predetermined height, said holding circuit embodying a switch and means for closing said switch only upon the closing of second solenoid circuit.

3. In a control system for supplying liquid by a pump to a container, an electrical motor for driving the pump and having a line connection, a switch in the line, a solenoid for controlling the switch, a circuit for the solenoid including a second switch, a second solenoid for opening the second switch, a circuit for the second solenoid, means for closing the circuit for the second solenoid when the level of the liquid in the container reaches a predetermined height, a holding circuit including said second solenoid, a switch closed by the second solenoid when energized and an additional switch, and means for closing the additional switch whenever the liquid in the container is above a predetermined height less than the first mentioned predetermined height.

4. In a control system for supplying liquid by a pump to a container, an electrical motor for driving the pump and having a line connection, a switch in the line, a solenoid for controlling the switch, a circuit for the solenoid including a second switch, a second solenoid for opening the second switch, a circuit for the second solenoid including a U-tube liquid switch having spaced terminals in one leg for engagement by the liquid in the U-tube, means for moving the liquid in the U-tube in accordance with changes in levels of the liquid in the container, a holding circuit including said second solenoid, a switch closed by the second solenoid, and holding circuit terminals engageable by the liquid in the U-tube, said last named terminals being so related as to be connected by the liquid before the first mentioned spaced terminals.

5. In a control system for supplying liquid by a pump to a container, an electrical motor for driving the pump and having a line connection, a switch in the line, a solenoid for controlling the switch, a circuit for the solenoid including a second switch, a second solenoid for opening the second switch, a circuit for the second solenoid including a U-tube liquid switch, having spaced terminals in one leg for engagement by the liquid in the U-tube, a conduit extending from the other leg above the liquid into the container and open at its bottom so that changes in levels of the liquid in the container will develop pressure on the U-tube liquid and cause it to move in accordance with said level changes, a switch closed by the second solenoid, a holding circuit terminal positioned between the first mentioned spaced terminals and engageable by the liquid in the U-tube and a conductor between the holding circuit terminal and the solenoid.

6. In a control system for supplying liquid by an electric motor driven pump to a container and wherein there is provided a solenoid operated line switch for the motor together with a circuit for said solenoid including a switch and a second circuit includng a second solenoid for holding the switch open and closing a third switch, a U-tube having conducting liquid therein, three terminals extending into one leg of the U-tube and spaced for successive contact by the liquid therein as it is caused to be moved up said leg, the upper and lower terminals being adapted to be connected in said second circuit and said upper terminal also to one contact of the third switch, and the intermediate terminal to the other contact of the third switch, and conduit means for placing the other leg of the U-tube in communication with the container so that changing levels in the tank will develop such pressures on the liquid in said other leg as to cause the liquid in the U-tube to move up and down in the first leg in accordance with said level changes.

7. In a control system for supplying liquid by an electric motor driven pump to a container and wherein there is provided a solenoid operated line switch for the motor together with a circuit for said solenoid including a switch and a second circuit including a second solenoid for holding the switch open and closing a third switch, a U-tube having conducting liquid therein, a plurality of terminals greater than three extending into one leg of the U-tube and spaced for successive contact by the liquid therein as it is caused to be moved up said leg, the lower terminal and one of the upper terminals being adapted to be connected in said second circuit and said upper terminal also to one contact of the third switch, and an intermediate terminal to the other contact of the third switch, said other terminals being arranged for alternate connection in the second circuit and to the said other contact of the third switch so as to vary the points of closing of the second circuit and the opening of the third switch and conduit means for placing the other leg of the U-tube in communication with the container so that changing levels in the tank will develop such pressures on the liquid in said other leg as to cause the liquid in the U-tube to move up and down in the first leg in accordance with said level changes.

8. In a control system for a container supplied by liquid from a pump, an electric motor for driving the pump, a line connection for the motor, a switch for the motor line, means associated with the container and the switch of the motor line for causing the switch to be opened and the motor and pump to be inoperative when the level of liquid in the container reaches a predetermined height and for subsequently closing the switch and causing the electric motor and pump to be operative when the level of liquid in the container lowers a predetermined distance below said predetermined height, said means comprising an electrical circuit and solenoid for controlling the motor line switch, a second solenoid operative when energized for de-energizing the first solenoid, means for energizing the second solenoid when the liquid in the container reaches the predetermined height, and other means including an electrical circuit controlled by the energization of the second solenoid to cause said second solenoid to continue to be energized and maintain the first solenoid de-energized until the level of the liquid in the container lowers the said predetermined distance below the predetermined height.

9. In a control system for a container supplied by liquid from a pump, an electric motor for driving the pump, a line connection for the motor, a switch for the motor line, a solenoid for controlling the switch, a circuit for the solenoid, a switch for said solenoid circuit, a second solenoid, a circuit for the second solenoid, means for closing the circuit for the second solenoid when the level of the liquid in the container reaches a predetermined height, a holding circuit including a switch and the second solenoid, said switch of the holding circuit and the switch of the circuit for the first mentioned solenoid circuit having their movable elements connected together for simultaneous control by the second solenoid so that when the second solenoid is energized the holding circuit will be closed and the circuit of the first named solenoid will be opened, and means for maintaining the holding circuit closed until the liquid in the container falls to a level below the predetermined height.

JAMES BURTON DRYDEN.

REFERENCES CITED

The following references are of record in the file of this patent:

UNITED STATES PATENTS

| Number | Name | Date |
|---|---|---|
| 1,463,986 | Wherland | Aug. 7, 1923 |
| 2,078,479 | Briggs | Apr. 27, 1937 |
| 2,110,313 | Warwick | Mar. 8, 1938 |
| 2,318,066 | Dodd | May 4, 1943 |